July 15, 1941.  W. HILL  2,249,138
TRACTION DEVICE
Filed April 22, 1939   3 Sheets-Sheet 1

Walter Hill
Inventor
Faulknew & Faulknew
Attorneys

July 15, 1941.  W. HILL  2,249,138
TRACTION DEVICE
Filed April 22, 1939  3 Sheets-Sheet 2
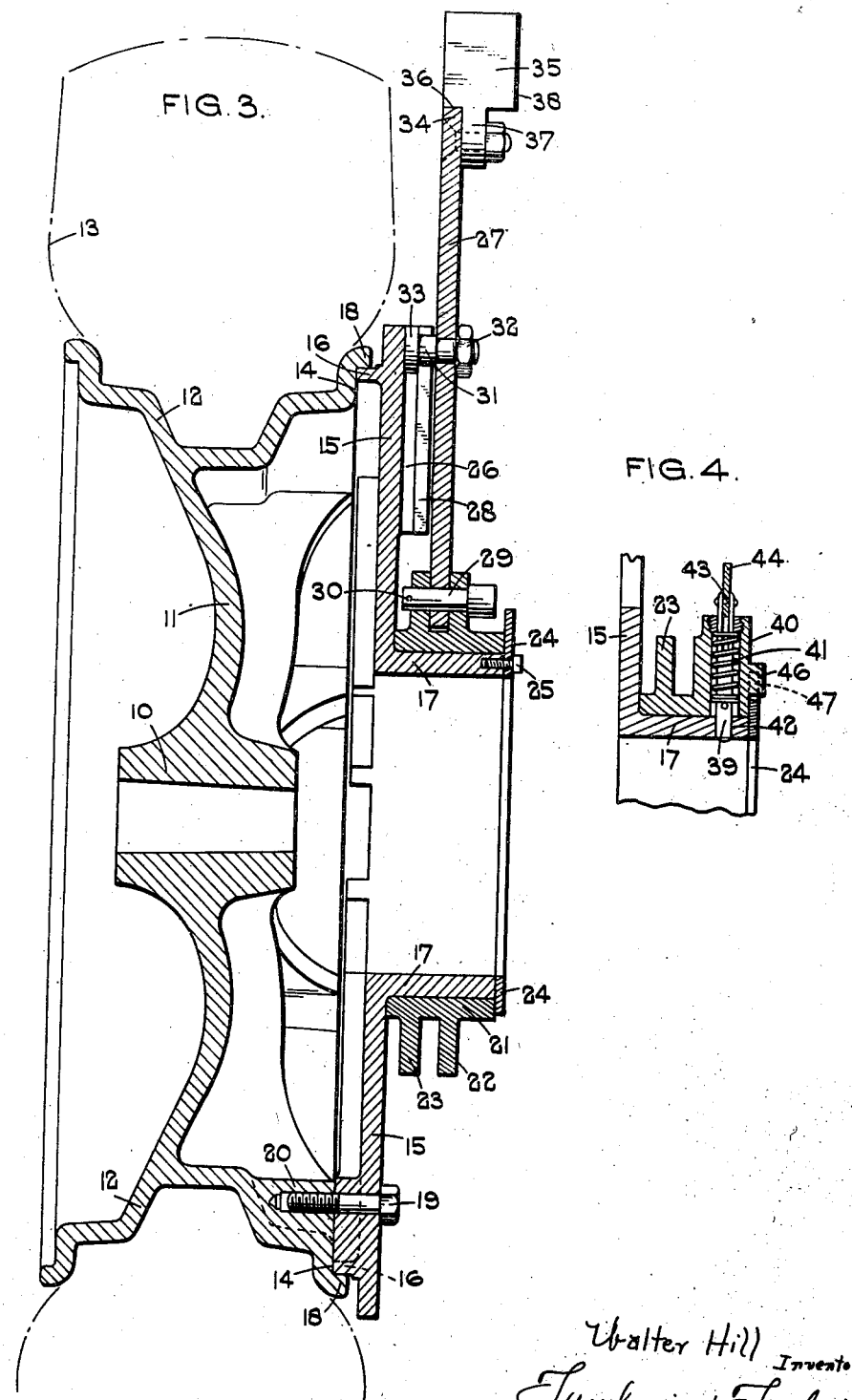
Walter Hill Inventor

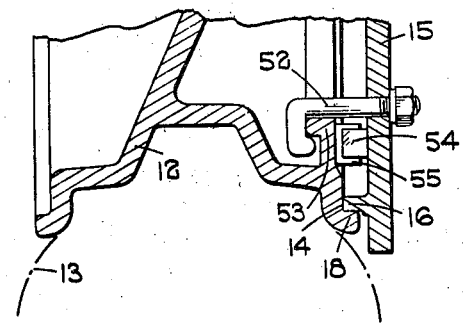

Patented July 15, 1941

2,249,138

UNITED STATES PATENT OFFICE 2,249,138

TRACTION DEVICE

Walter Hill, Evesham, England

Application April 22, 1939, Serial No. 269,534
In Great Britain April 25, 1938

5 Claims. (Cl. 301—47)

This invention concerns attachments for wheels such as rubber or pneumatic tyred wheels of cars, lorries, tractors or the like and of the kind including auxiliary cleats or lugs adapted for movement between an operative position with the outer ends of the cleats or lugs projecting beyond the periphery of the wheel and an inoperative position with said outer ends retracted within said periphery and means being provided for retaining the cleats or lugs in an adjusted position.

Referring to the drawings—

Figure 3 is a section on line 3—3 of Figure 1.

Figure 4 is a section on line 4—4 of Figure 1.

Figure 5 is a detail sectional view of a slight modification.

Figure 1:
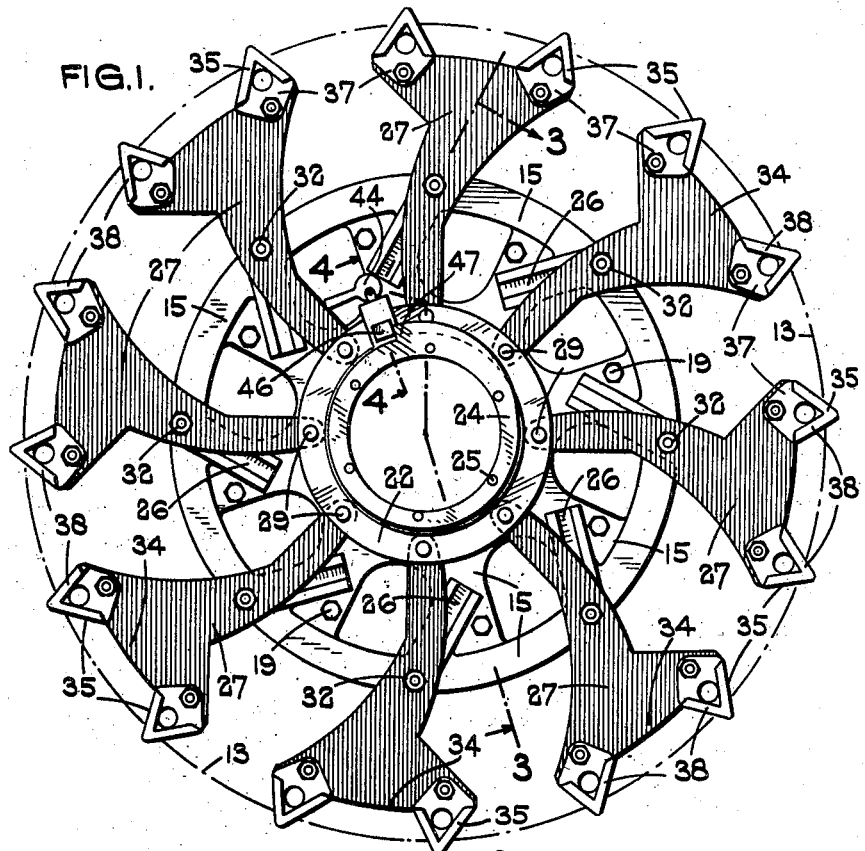
Figure 1 is an elevation of one construction according to this invention.

In the construction illustrated in Figures 1 to 4 a wheel comprising a boss 10, spokes 11 and rim 12 for the pneumatic or other rubber tyre 13 has, on the outer side of the rim, a flange 14 disposed in a plane at right angles to the rotational axis of the wheel.

Upon this flange is adapted to fit an attachment including a substantially circular disc 15 having on its inner face an integral flange 16 to seat against the wheel flange 14, whilst in the centre of the disc is a circular opening around which is a boss 17 projecting from the outer face of the disc.

The outer peripheral edge of the flange 16 on the disc 15 is adapted to seat within the peripheral outwardly projecting rim 18 on the wheel so as to locate the attachment positively upon the wheel and the disc 15 is secured to the wheel by means of studs 19 passing through holes in the disc and engaging in internally screw threaded holes in bosses 20 formed integrally with the rim.

Rotatably mounted on the exterior of the boss 17 is a collar 21 provided with two spaced annular flanges 22 and 23 projecting on the outer surface of the collar.

This collar is maintained on the boss 17 by a retaining ring 24 fixed to the outer end of the boss by means of screws 25 engaging in internally screw threaded holes in the end of the boss.

Upon the outer face of the disc 15 is a series of guides 26 one for each of the cleats or lugs 27, each guide comprising a substantially straight open-ended channel extending non-radially across the disc, i. e. in a direction intermediate a radius of and a tangent to the disc.

Each guide is open at both ends and is of undercut or inverted T section with overhanging lips or edges 28 so that the open top of the guide is of width less than that of the interior of the main part of the guide.

Each cleat 27 is pivoted at its inner end upon a pin 29 inserted through aligned holes in the end of the cleat and in the flanges 22 and 23 on the collar 21, the pin having an enlarged head at its outer end and being retained in position by a cotter or the like 30.

Intermediate its ends each cleat has a lateral projection for engaging slidably in the guide 26, this projection comprising a shank 31 with a reduced outer end passing through a hole in the cleat and secured therein by a nut 32, whilst at the inner end of the shank is a head 33. The shank 31 fits slidably between the overhanging lips 28 of the channel, whilst the head 33 is located beneath these lips and within the main part of the channel.

The head 33 may be in the form of a roller or collar rotatably mounted on the end of the shank to facilitate sliding movement along the guide, such roller being mounted upon a reduced end portion of the shank and being secured in position either by a thin nut or by riveting over the projecting end of the shank.

At its outer end 34 each cleat is of increased width in a direction extending circumferentially of the wheel so as to provide a relatively large area of contact between the cleat and the ground and so that each cleat can be effective over a substantial sector of the wheel.

A pair of separately formed spuds 35 are secured one at each end of the ground-engaging face of each cleat, each spud being of pointed or triangular form in side elevation and having a shoulder 36 fitting against the ground-engaging face of the cleat and an integral lug 37 by means of which the spud is bolted to the cleat.

Each spud has thickened flanges 38 along the converging sides thereof for increasing the ground-engaging surface and for preventing the cleat penetrating too deeply into the ground.

In addition the outer end of the cleat may be provided with a ground-engaging surface of substantial area, this ground-engaging surface being formed either by suitably thickening or flanging the outer end of the cleat or by bolting or otherwise securing to the end of the cleat a suitable wearing plate of angle or other convenient section.

For retaining the cleats in an adjusted position a locking pin 39 is mounted slidably in a boss 40 on the collar 21, this pin being surrounded by a spring 41 acting to urge the inner end of the pin into one of a number of holes 42 formed radially through the boss 17.

The outer end of the pin is bifurcated to support a pivot pin 43 upon which is rotatably mounted an adjusting cam 44 provided with an extension or operating handle 45.

On the outer face of the boss 40 is an integral stop 46 adapted for engagement with a radial shoulder 47 on the retaining ring 24 to limit movement of the collar 21 in one direction relative to the boss 17 as will hereinafter be described.

In the construction illustrated the disc 15 is formed by a casting operation with integral flange 16 on one face and with integral boss 17 and guide channels 26 on the other face, but if desired the disc 15 may be in the form of a steel plate and the flange 16, boss 17 and guide channels 26 may be formed separately of this plate and welded or otherwise secured thereto.

The collar 21 is also formed by a casting operation with integral flanges 22, 23 and boss 40 and if desired this part of the attachment may also be fabricated from separate steel parts welded or otherwise secured together.

The cleats 27 are, in the construction illustrated, of flat plate-like form and may be constructed from steel plate but as an alternative these cleats may also be formed by a casting operation and may have an integral abutment for engaging in the guide channel 26 and with a thickened or flanged end to form the ground-engaging face of the cleat or to receive the detachable spuds 35 or wearing plates as above described.

In either construction including separately formed spuds or wearing plates the latter are preferably mounted so that they can readily be detached for attention or replacement.

Each of the guide channels 27 is open at each end to allow entry of the projections 33 on the cleats during assembly of the attachment and to enable the engagement between the projections and the guides to be self-cleaning in use.

To assemble the attachment the collar 21 is placed upon the boss 17 and secured by the ring 24, after which the cleats are mounted in position by engaging the projection 33 of each cleat in the appropriate guide channel 26 and then inserting and securing the pivot pins 29 connecting the inner ends of the cleats to the flanges 22 and 23 of the collar 21.

After such assembly the movements of the cleats is such that the projections 33 always remain in use within the confines of the guide channels 26 which are of sufficient length to prevent the projections 33 leaving either end of the channel under normal conditions of use.

Figure 2:
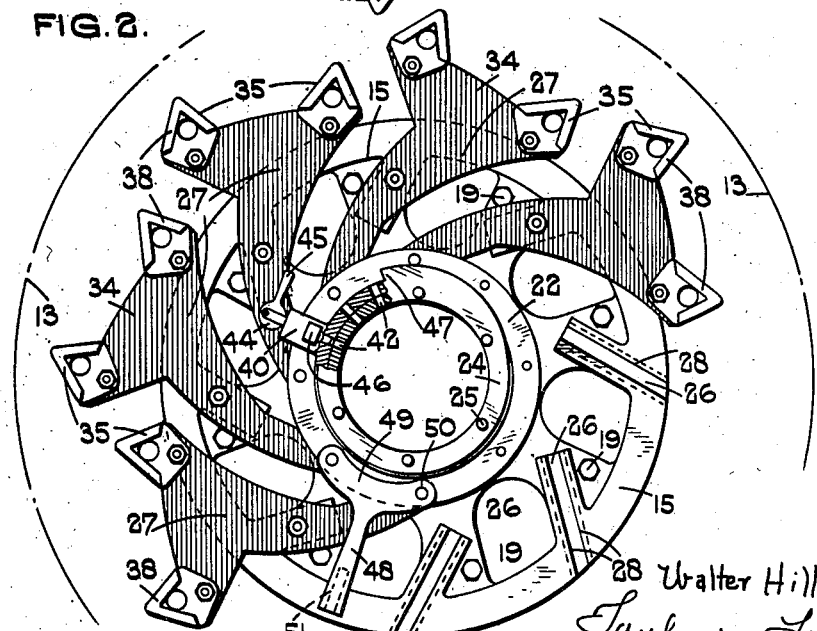
Figure 2 is a similar view with the cleats in a further adjusted position and with some of the cleats removed.

The cleats are shaped or curved intermediate their ends so that in an inoperative or collapsed position as shown in Figure 2 the cleats nest closely one upon the other and around the exterior of the collar 21, the shaping of the ground-engaging ends being such that the leading end of the ground-engaging portion of each cleat fits snugly against the trailing end of the ground-engaging portion of the preceding cleat with the spuds 38 clear of the normal deflection line of the tyre of the wheel.

This permits greater retraction of the cleats than has hitherto been possible, such retraction being very advantageous when the vehicle is travelling over rough ground or rutty roads.

To adjust the cleats from this retracted position the locking pin 39 is lifted to the position shown in Figure 2 by operation of the cam 44 and the collar 21 is then free to rotate upon the boss 17.

In Figure 2 is shown a tool 48 for rotating the collar 21 to adjust the positions of the cleats, this tool having a handle at one end of which is an arcuate portion 49 at each end of which is a hole 50 for engagement over the head of one of the pivot pins 29, the spacing between the holes 50 being such that the tool can be applied at any position around the collar and will fit over the heads of any pair of adjacent pivot pins 29.

This tool provides sufficient leverage to enable the collar 21 to be rotated by hand upon the boss 17 so as to move the cleats in unison to a projected position.

After the cleats have been moved to the desired position of adjustment the collar 21 is locked by returning the locking pin to its operative position in engagement in the appropriate hole 42. A socket 51 is formed in the projecting end of the handle of the tool 48, this socket being capable of fitting over the handle 45 of the cam 44 so that the tool can be used for operating the cam either to release or lock the collar 21.

In Figure 1 the cleats are shown in their fully projected position but any desired number of positions of adjustment may be provided for so that the ground-engaging surface of the cleats can be disposed at any one of a number of different annular levels in relation to the periphery of the tyre and of the normal deflection line thereof.

In Figure 5 is illustrated a slight modification in which the disc 15 is secured to the rim of the wheel by hook bolts 52 passing through holes in the disc and engaging with a flange 53 on the wheel as an alternative to the studs 19 as described above.

A further detail illustrated in Figure 5 is the provision of lugs 54 on the inner face of the disc 15 for engagement between or with lugs 55 on the rim of the wheel to locate the disc upon the wheel against rotation relative to the wheel.

In either of the above constructions the wheel may be used without the attachment and the cleats and in such case the rim functions in the normal manner to carry the tyre 13.

When it is desired to use the cleats in combination with the tyre the attachment including the disc 15, collar 21 and cleats 27 is applied to the wheel and secured in position after which the cleats can be adjusted to the desired position as previously described.

Instead of forming the wheel with an integral rim or flange for the mounting of the attachment a separately formed ring or flange may be welded to the rim of the wheel, or alternatively, a number of angle pieces may be welded at spaced positions to the wheel rim to form the seating for the attachment and to receive the clamping or hook bolts.

The attachment can be applied to, or constructed for application to, any size or type of tractor or lorry wheel and is particularly suitable for application to lorries or other land vehicles for military use and required to travel over rough or broken ground.

The cleats may be ribbed or fluted to provide additional strength or stiffness but may be partly of skeleton-like form to reduce the weight of the attachment. The disc may also be of skeleton-like form and may be cut away intermediate the guides for the cleats.

The attachment above described can be formed cheaply and requires minimum attention in use since there is a minimum number of parts likely to cause trouble in practical operation. A number of different types of cleats may be adapted for application to a single type of disc so that an attachment with any one of a number of types of feet or ground-engaging portions may be constructed from standard interfitting parts.

Further, the cleats or lugs can quickly be removed for attention or replacement by withdrawing the cottered pins connecting the cleats to the rotatable ring.

When the various parts are formed by casting or like operations as above described the attachment can be made robust and capable of withstanding the rough usage to which such attachments are commonly subjected in use.

By providing the cleats with rollers movable in the guides on the disc, the engagement between the cleats and these guides can be virtually frictionless and open-ended guides or slots are self-cleaning in that the movement of the roller or projection along the guide forces any dirt or other foreign matter out of the guide through one or other of the open ends. There is thus no danger of such dirt clogging the guides in a manner which might impede or prevent effective operation of the cleats.

Such attachments are frequently exposed to rough and dirty weather conditions and the guides for the cleats are most likely to collect dirt which under the packing action caused by the movements of the cleats would be likely to cause trouble unless means are provided for cleaning the guides as above described.

What I claim then is:

1. An attachment for a wheel of the kind referred to including a member adapted for application to an existing wheel, guides on said member, lateral projections on the cleats intermediate the ends thereof, said projections engaging slidably in said guides, each of said guides being open ended so that the engagement between the projections and the guides will be a self-cleaning one, a collar adjustably mounted on said member, each cleat being pivoted at its inner end to said collar, said collar being adjustable on said member to move said cleats in unison between said operative and inoperative positions.

2. An attachment for a wheel of the kind referred to including a member adapted for application to an existing wheel, guides on said member, elongated cleats extending radially of said member, lateral projections on the cleats intermediate the ends thereof, shoulders on said projections, said projections engaging slidably in said guides, each guide comprising a channel open at both ends with overhanging edges for engagement with said shoulders to locate the cleats positively in the guides in a direction transverse to the plane of rotation of the wheel, a collar adjustably mounted on said member, each cleat being pivoted at its inner end to said collar, and said collar being adjustable on said member to move said cleats in unison between said operative and inoperative positions.

3. An attachment for a wheel of the kind referred to including a disc adapted for application to an existing wheel, cleats arranged radially of said member, guides on the outer face of said disc, lateral projections on said cleats intermediate the ends thereof, said projections engaging slidably in said guides, each of said guides being open ended so that the engagement between the projections and the guides will be a self-cleaning one, each guide being substantially straight and extending at an angle to the radially arranged cleats adjustably positioned over the outer face of the disc, shoulders on said projections, each guide comprising a channel with overhanging edges for engagement with said shoulders to locate the cleats positively in the guides in a direction transverse to the plane of rotation of the wheel, a collar mounted adjustably on said disc, each cleat being pivoted at its inner end to said collar, and said collar being adjustable on said disc to move the cleats in unison between said operative and inoperative positions.

4. An attachment for a wheel of the kind referred to including a disc-like member adapted for attachment to the rim of a wheel, guides formed integrally with said member, cleats on said attachment, a lateral projection on each of said cleats intermediate the ends thereof, said projection engaging slidably in one of said guides, each of said guides comprising a straight open ended channel extending at an angle to a radial line on the outer face of the attachment, overhanging edges on said guide, shoulders on said projections for engagement with said overhanging edges to locate the cleats positively in the guides in a direction transverse to the plane of rotation of the wheel, a boss on said member, a collar rotatably mounted on said boss, spaced flanges on said collar, the inner end of each of said cleats being located between said flanges and a pivot pin inserted through aligned holes in the flanges and in the inner end of each cleat.

5. An attachment for a wheel of the kind referred to including a member adapted for application to an existing wheel, guides on said member, elongated cleats extending radially of said member, lateral projections on said cleats intermediate the ends thereof, said projections engaging slidably in said guides, each guide being substantially straight and extending at an angle to a radial line on the outer face of the wheel, each guide being open-ended so that the engagement between the cleats and the guides will be a self-cleaning one.

WALTER HILL.